United States Patent [19]

Schriever

[11] Patent Number: 5,551,994
[45] Date of Patent: Sep. 3, 1996

[54] NON-CHROMATED OXIDE COATING FOR ALUMINUM SUBSTRATES

[75] Inventor: Matthias P. Schriever, Kent, Wash.

[73] Assignee: The Boeing Company, Seattle, Wash.

[21] Appl. No.: 287,690

[22] Filed: Aug. 9, 1994

Related U.S. Application Data

[60] Continuation-in-part of Ser. No. 173,591, Dec. 23, 1993, Pat. No. 5,487,949, which is a division of Ser. No. 525,800, May 17, 1990, Pat. No. 5,298,092, said Ser. No. 287,690, Aug. 9, 1994, is a continuation-in-part of Ser. No. 173,593, Dec. 23, 1993, which is a division of Ser. No. 525,800, May 17, 1990, Pat. No. 5,298,092, said Ser. No. 287,690, is a continuation-in-part of Ser. No. 212,654, Mar. 11, 1994, which is a continuation of Ser. No. 621,132, Nov. 30, 1990, said Ser. No. 287,690, is a continuation-in-part of Ser. No. 58,655, May 6, 1993, which is a continuation of Ser. No. 732,586, Jul. 19, 1991, abandoned, said Ser. No. 287,690, is a continuation-in-part of Ser. No. 903,853, Jun. 25, 1992.

[51] Int. Cl.$^6$ .................................................... C23C 22/56
[52] U.S. Cl. ......................... 148/273; 148/275; 148/274
[58] Field of Search ................................. 148/273, 214, 148/215

[56] References Cited

U.S. PATENT DOCUMENTS

| | | |
|---|---|---|
| 1,551,613 | 9/1925 | Pacz . |
| 1,607,676 | 11/1926 | Jirotka . |
| 2,796,370 | 6/1957 | Ostrander et al. . |
| 2,796,371 | 6/1957 | Ostrander et al. . |
| 2,906,009 | 9/1959 | Knoll et al. . |
| 3,138,479 | 6/1964 | Foley . |

(List continued on next page.)

FOREIGN PATENT DOCUMENTS

| | | |
|---|---|---|
| A-39376/89 | 8/1990 | Australia . |
| 0356756A1 | 7/1990 | European Pat. Off. . |
| 405340A1 | 1/1991 | European Pat. Off. . |
| 458020A1 | 11/1991 | European Pat. Off. . |
| 0488430A2 | 6/1992 | European Pat. Off. . |
| 0523288A1 | 6/1993 | European Pat. Off. . |
| 745704 | 11/1944 | Germany . |
| 61-238979 | 10/1986 | Japan ..................... 148/286 |
| 953987 | 4/1964 | United Kingdom . |
| 1345868 | 2/1974 | United Kingdom . |
| WO91/11542 | 8/1991 | WIPO . |

OTHER PUBLICATIONS

G. Jander and E. Blasius, Einfuhrung in das anorganisch—chemische Praktikum (1968), pp. 106–107.

(List continued on next page.)

Primary Examiner—Sam Silverberg
Attorney, Agent, or Firm—Paul C. Cullom, Jr.

[57] ABSTRACT

An improved process that is commercially practical for forming an oxide film cobalt conversion coating exhibiting corrosion resistance and paint adhesion properties on an aluminum or aluminum alloy substrate for use in aircraft/aerospace applications (for example, an aluminmn or aluminum alloy commercial airplane part), the process comprising the steps of: (a) providing an oxide film forming cobalt conversion solution comprising an aqueous reaction solution prepared by reacting the following starting materials:

(1) a cobalt-II salt;

(2) an ammonium salt;

(3) one or more inorganic complexing agents selected from a soluble metal carboxylate, a soluble metal nitrite, or ammonia;

(4) a water soluble amine; and (5) an oxidizing agent; and (b) contacting the substrate with the aqueous reaction solution for a sufficient amount of time to oxidize the surface of the substrate, whereby the oxide film cobalt conversion coating is formed, thereby imparting corrosion resistance and paint adhesion properties to the substrate.

A similar commercially practical process for aluminum or aluminum alloy substrates for use in non-aircraft/aerospace applications (for example, an aluminum or aluminum alloy marine hardware part) employs the above steps, but does not include the ammonium salt in the starting materials.

57 Claims, 3 Drawing Sheets

U.S. PATENT DOCUMENTS

| | | |
|---|---|---|
| 3,403,035 | 9/1968 | Schneble et al. . |
| 3,423,214 | 1/1969 | Koretzky . |
| 3,438,798 | 4/1969 | Baudrand et al. . |
| 3,444,007 | 5/1969 | Maurer et al. . |
| 3,592,747 | 7/1971 | Cohn . |
| 3,615,740 | 10/1971 | Goltz . |
| 3,790,453 | 2/1974 | Wanamaker et al. . |
| 3,819,424 | 6/1974 | Russell et al. . |
| 3,870,607 | 3/1975 | Bardach . |
| 3,877,981 | 4/1975 | Arnold ............................... 427/305 |
| 3,905,838 | 9/1975 | Ito . |
| 3,928,237 | 12/1975 | Davis . |
| 3,954,510 | 5/1976 | Gunn et al. ......................... 148/267 |
| 3,993,510 | 11/1976 | Bellavin . |
| 4,088,486 | 5/1978 | Bissonette . |
| 4,150,172 | 4/1979 | Kolk, Jr. . |
| 4,208,212 | 6/1980 | Kuzuwata et al. . |
| 4,218,240 | 8/1980 | Gingerich et al. . |
| 4,233,063 | 11/1980 | Ritsko et al. . |
| 4,261,766 | 4/1981 | Crouch . |
| 4,278,463 | 7/1981 | Vanderpool et al. . |
| 4,278,477 | 7/1981 | Reinhold . |
| 4,337,097 | 6/1982 | Tokumasu et al. . |
| 4,348,224 | 9/1982 | Gingerich et al. . |
| 4,381,203 | 4/1983 | Reinhold . |
| 4,392,920 | 7/1983 | McDonald . |
| 4,631,093 | 12/1986 | Etemovich ......................... 148/244 |
| 4,637,374 | 1/1987 | Arai . |
| 4,647,347 | 3/1987 | Schoener ............................ 148/273 |
| 4,659,605 | 4/1987 | Malik et al. . |
| 4,696,724 | 9/1987 | Deguchi et al. . |
| 4,804,407 | 2/1989 | Scheithauer et al. . |
| 4,897,129 | 1/1990 | Tuttle, Jr. et al. . |

OTHER PUBLICATIONS

Van Nostrand's Scientific Encyclopedia (1983), sixth edition, vol. 1, p. 124, "Ammines".

"Deposition of Nickel and Cobalt by Chemical Reduction," Brenner & Riddell, *J. of Research of the National Bureau of Standards*, pp. 385–395, vol. 39, No. 1947.

European Search Report on Appln. No. EP 91 20 2181 (corr. to U.S. Appln. No. 07/621,132) dated 12 Oct. 1982.

Pascal, *Nouveau Traite de Chimie Minerale*, 1959, Masson & Cie, Paris, Fr., vol. XVIII, pp. 680–681: Cobaltnitrites.

English translation of above document (Pascal, *Nouveau Traite de Chimie Minerale*).

"Nickel and Cobalt Films" by Samuel Wein; *The Glass Industry*, pp. 22, 23, 35, and 46, Jan. 1960.

"Regulating Coercivity of Magnetic Thin Films," Tsu & Sakamoto, *IBM Tech. Discl. Bull.*, pp. 52–53, vol. 4, No. 8, Jan. 1962.

European Search Report on Appln. No. EP 91 10 3498 dated 28 Jun. 1991, the Hague (corr. to U.S. Ser. No. 07/525,800).

*Chemical Abstracts*, vol. 89, 1978, abstract No. 122118c, Complexes of Cobalt containing ammonia or ethylenediamine.

European Search Report on Appln. No. EP 91 20 2515 (corr. to U.S. Appln. No. 07/732,568) dated 9 Oct. 1992.

M. Munakata, "Some New Oxygenated Cobalt Complexes," *Bulletin of The Chem. Soc. of Japan*, vol. 44, pp. 1791–1796 (1971).

S. Fukuzumi et al., "Activation of Cobalt (III)—Alkyl Bonds . . . ," *Chemistry Letters*, pp. 421–424 (1984).

I. Sasaki et al., "X–Ray And Electrochemical Investigation Of A Series Of Cobalt . . . ," *Polyhedron*, vol. 6, pp. 2103–2110 (1987).

PCT International Search Report, International appln. No. PCT/EP 93/01630, dated 14 Oct. 1993 (4 pages).

W. Fernelius ed., "69. Hexamminecobalt(III) Salts," *Inorganic Syntheses*, first edition, vol. II, pp. 216–225 (McGraw–Hill 1946).

A. Martell and M. Calvin, *Chemistry Of The Metal Chelate Compounds*, pp. 1–18 (Prentice–Hall 1952).

NON-CHROMATED OXIDE COATING FOR ALUMINUM SUBSTRATES

CROSS-REFERENCE TO RELATED APPLICATIONS

This application is related to application Ser. No. 07/525,800 (patent application #1), filed May 17, 1990, now U.S. Pat. No. 5,298,092 issued Mar. 29, 1994, and that patent is incorporated herein by reference.

This application is a continuation-in-part of copending application Ser. No. 08/173,591, filed Dec. 23, 1993, now U.S. Pat. No. 5,487,949 and that application is incorporated herein by reference. Application Ser. No. 08/173,591 is a divisional of the above application Ser. No. 07/525,800 (patent application #1), filed May 17, 1990, now U.S. Pat. No. 5,298,092 issued Mar. 29, 1994.

This application is a continuation-in-part of copending application Ser. No. 08/173,593, also filed Dec. 23, 1993, and that application is incorporated herein by reference. Application Ser. No. 08/173,593 is also a divisional of the above application Ser. No. 07/525,800 (patent application #1), filed May 17, 1990, now U.S. Pat. No. 5,298,092 issued Mar. 29, 1994.

This application is also a continuation-in-part of copending application Ser. No. 08/212,654, filed Mar. 11, 1994, and that application is incorporated herein by reference. Application Ser. No. 08/212,654 is a continuation of Ser. No. 07/621,132 (patent application #2), which was filed Nov. 30, 1990, and is now abandoned.

This application is also a continuation-in-part of copending application Ser. No. 08/058,655, filed May 6, 1993, and that application is incorporated herein by reference. Application Ser. No. 08/058,655 is a continuation of Ser. No. 07/732,568 (patent application #3), that was filed Jul. 19, 1991, and is now abandoned.

This application is also a continuation-in-part of copending application Ser. No. 07/903,853 (patent application #4), filed Jun. 25, 1992, and that application is incorporated herein by reference.

BACKGROUND OF THE INVENTION

1) Field of the Invention

This environmental-quality invention is in the field of chemical conversion coatings formed on aluminum and aluminum alloy substrates. One aspect of the invention is an improved process of forming an oxide coating, referred to as a "cobalt conversion coating," that is chemically formed by oxidizing the surface of an aluminum or aluminum alloy substrate. The invention enhances the quality of the environment of mankind by contributing to the maintenance of air and water quality.

2) Description of the Related Art

In general, chemical conversion coatings are formed chemically by causing the surface of the metal to be "converted" into a tightly adherent coating, all or part of which consists of an oxidized form of the substrate metal. Chemical conversion coatings can provide high corrosion resistance as well as strong bonding affinity with paint. The industrial application of paint to metals generally requires the use of a chemical conversion coating, particularly when the performance demands are high.

Although aluminum protects itself against corrosion by forming a natural oxide coating, the protection is not complete. In the presence of moisture and electrolytes, aluminum alloys, particularly the high-copper 2000-series aluminum alloys, such as alloy 2024-T3, corrode much more rapidly than pure aluminum.

In general, there are two types of processes for treating aluminum to form a beneficial conversion coating. The first is by anodic oxidation (anodization) in which the aluminum component is immersed in a chemical bath, such as a chromic or sulfuric acid bath, and an electric current is passed through the aluminum component and the chemical bath. The resulting conversion coating on the surface of the aluminum component offers resistance to corrosion and a bonding surface for paint.

The second type of process is by chemically producing a conversion coating, which is commonly referred to as a chemical conversion coating, by subjecting the aluminum component to a chemical solution, such as a chromic acid solution, but without using an electric current in the process. The chemical solution may be applied by immersion application, by manual application, or by spray application. The resulting conversion coating on the surface of the aluminum component offers resistance to corrosion and a bonding surface for paint. The present invention relates to this second type of process for producing chemical conversion coatings. The chemical solution may be applied by immersion application, by various types of manual application, or by spray application.

One widely used chromic acid process for forming chemical conversion coatings on aluminum substrates is described in various embodiments in Ostrander et al. U.S. Pat. No. 2,796,370 and Ostrander et al. U.S. Pat. No. 2,796,371, in military process specification MIL-C-5541, and in Boeing Process Specification BAC 5719. These chromic acid chemical conversion baths contain hexavalent chromium, fluorides, and cyanides, all of which present significant environmental as well as health and safety problems. The constituents of a typical chromic acid conversion bath, such as ALODINE 1200, are as follows: $CrO_3$—"chromic acid" (hexavalent chromium); $NaF$—sodium fluoride; $KBF_4$—potassium tetrafluoroborate; $K_2ZrF_6$—potassium hexafluorozirconate; $K_3Fe(CN)_6$—potassium ferricyanide; and, $HNO_3$—nitric acid (for pH control).

Many aluminum and aluminum alloy structural parts, as well as Cd plated, Zn plated, Zn-Ni plated, and steel parts, throughout the aircraft/aerospace industry are currently being treated using this chromic acid process technology. Chromic acid conversion films, as formed on aluminum and aluminum alloy substrates, meet a 168 hours corrosion resistance criterion, but they primarily serve as a surface substrate for paint adhesion. Because of their relative thinness and low coating weights (40–150 milligrams/ft$^2$), chromic acid conversion coatings do not cause a fatigue life reduction in the aluminum and aluminum alloy structure.

However, environmental regulations in the United States, particularly in California, and in other countries are drastically reducing the allowed levels of hexavalent chromium compounds in effluents and emissions from metal finishing processes. Accordingly, chemical conversion processes employing hexavalent chromium compounds must be replaced. The present invention, which does not employ hexavalent chromium compounds, is intended to replace the previously used chromic acid process for forming conversion coatings on aluminum and aluminum alloy substrates.

ITO U.S. PAT. NO. 3,905,838

Ito U.S. Pat. No. 3,905,838 discloses a bath comprising, as the main liquid, either or both of aqueous hydrogen peroxide solution and aqueous ammonia and additionally incorporating an oxidizing agent, an inhibitor to retard liquid temperature elevation, a stabilizer for solution and, if a heavy metal is present, triethanolamine as a valency stabilizer for said heavy metal, which bath is used for treating the surface of aluminum or an alloy thereof to nonelectrolytically form a colored oxide film on the surface. In addition, Ito discloses a method of forming on the said surface, a colored oxide film by thoroughly washing the surface of the aluminum or an aluminum alloy and subsequently immersing the washed metal in the said bath.

Thus, Ito describes a bath for forming a film of aluminum oxide. The bath contains aqueous ammonia, aqueous hydrogen peroxide, an oxidizing agent (for example, $KBrO_3$ alone or in combination with $(NH_4)_2CO_3$), an inhibitor (for example, KF, $NH_4Cl$, or sorbitol) which is capable of retarding the bath temperature increase and preventing the film of aluminum hydroxide from dissolution, and triethanolamine which functions as a bath stabilizer (see col. 2, line 63—col. 3, line 9). If the bath contains a heavy metal ion, the triethanolamine functions as the valency stabilizer of the heavy metal ion (see col. 3, lines 9–11).

Ito states that when the bath is composed solely of ammonia, an oxidizing agent, hydrogen peroxide, and a heavy metal, the bath is so chemically unstable that if it is allowed to stand in its unaltered form, it will no longer function as desired after several hours of standing (see col. 4, lines 58–64). Ito states further that when such a bath (composed solely of ammonia, an oxidizing agent, hydrogen peroxide, and a heavy metal) is used to treat the aluminum alloy repeatedly, the bath readily undergoes decomposition and becomes unusable in a short period of time (see col. 4, lines 64–67). This is because, if the bath contains the salt of a heavy metal, it has its chemical composition changed by the variation of the valency of the heavy metal such as, for example,

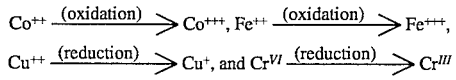

(see col. 4, line 68–col. 5, line 4). To preclude such change of the chemical composition of the bath, Ito incorporates in his bath the aforementioned inhibitor (for example, KF, $NH_4Cl$, or sorbitol) for retarding the bath temperature increase and triethanolamine as a stabilizer serving to prevent possible change of the valency of the heavy metal (see col. 5, lines 4–10).

Example 4 of Ito describes preparing a bath containing 500 cc of 28% 3N $NH_4OH$ solution, 10.0 g of KF, 5.0 g of $NH_4Cl$, 2.5 g of $NH_4F \cdot HF$, 1.2 g of $KBrO_3$, 1.0 g of $(NH_2)_2CS$, 0.7 g of $CoCl_2$, 0.5 g of $CuCl_2$, 0.1 g of sorbitol, and 5 cc of $(HOCH_2CH_2)_3N$ (triethanolamine). $CoCl_2$ is a cobalt-II salt. As described above, Ito uses triethanolamine as a valency stabilizer serving to prevent possible change of the valency of the heavy metal. Thus, the presence of triethanolamine in Example 4 would, presumably, prevent the small amount of cobalt-II salt which is present in the solution from being oxidized and precipitating out of the solution.

TOKUMASU ET AL. U.S. Pat. No. 4,337,097

Tokumasu et al. U.S. Pat. No. 4,337,097 discloses a method for making a selective absorption film for solar energy which comprises immersing aluminum or its alloy in water which contains at least two members selected from phosphate ions, fluoride ions and triethanolamine, and optionally ions of a metal selected from copper, iron, cobalt, silver and a mixture thereof thereby forming a chemical conversion film which shows a great absorptivity and a small emissivity.

SUMMARY OF THE INVENTION

The present invention exhibits certain improvements with respect to the processes described in the earlier related patent applications cross-referenced above: Ser. No. 07/525,800 (patent application #1), Ser. No. 07/621,132 (patent application #2), Ser. No. 07/732,568 (patent application #3), and Ser. No. 07/903,853 (patent application #4). In general, the improvements are, first, improved bath stability and consequently longer bath life, and, second, improved corrosion resistance performance exhibited by the coated aluminum or aluminum alloy substrates.

Regarding the improved bath stability, the bath of the present invention has no detectable decay rate after six months of production use. The decay rate is measured by the sludge formed in the bath. The bath of the present invention has no sludge in the bath after six months of production use. Furthermore, the bath performance effectiveness has not decreased in six months of production use. Another advantage is that the bath constituents are replenishable. A six-month bath life is considered a minimum for a commercially practical service life in the aircraft/aerospace industry. Thus, the present invention is a commercially practical process and a commercially practical bath.

Regarding the improved corrosion resistance performance, coated aluminum alloy substrates made by the improved process exhibit an increased level of corrosion resistance in a standard salt spray test, when tested in accordance with ASTM B117, while also exhibiting technically acceptable levels of paint adhesion when tested in accordance with the tests specified in applicable aircraft/aerospace paint specifications.

In one aspect, the invention is an improved process that is commercially practical for forming an oxide film cobalt conversion coating exhibiting corrosion resistance and paint adhesion properties on an aluminum or aluminum alloy substrate used in aircraft/aerospace applications, the process comprising the steps of:

(a) providing an oxide film forming cobalt conversion solution comprising an aqueous reaction solution prepared by reacting the following starting materials:
  (1) a cobalt-II salt;
  (2) an ammonium salt;
  (3) one or more inorganic complexing agents selected from a soluble metal carboxylate, a soluble metal nitrite, or ammonia;
  (4) a water soluble amine; and
  (5) an oxidizing agent; and (b) contacting the substrate with the aqueous reaction solution for a sufficient amount of time to oxidize the surface of the substrate, whereby the oxide film cobalt conversion coating is formed, thereby imparting corrosion resistance and paint adhesion properties to the substrate.

In another aspect, the invention is an improved process that is commercially practical for forming an oxide film cobalt conversion coating exhibiting corrosion resistance and paint adhesion properties on a substrate used in non-aircraft/aerospace applications, where the substrate is aluminum or aluminum alloy, the process comprising the steps of:

(a) providing an oxide film forming cobalt conversion solution comprising an aqueous reaction solution prepared by reacting the following starting materials:
  (1) a cobalt-II salt;
  (2) one or more inorganic complexing agents selected from the group consisting of metal carboxylates, metal nitrites, and ammonia;
  (3) a water soluble amine; and
  (4) an oxidizing agent; and
(b) contacting the substrate with the aqueous reaction solution for a sufficient amount of time to oxidize the surface of the substrate, whereby the oxide film cobalt conversion coating is formed, thereby imparting corrosion resistance and paint adhesion properties to the substrate.

In yet another aspect, the invention is a chemical conversion coating solution that is commercially practical for producing an oxide film cobalt conversion coating on a metal substrate used in aircraft/aerospace applications, the solution comprising an aqueous reaction solution prepared by reacting the following starting materials:
  (a) a cobalt-II salt;
  (b) an ammonium salt;
  (c) one or more inorganic complexing agents selected from the group consisting of a soluble metal carboxylate, a soluble metal nitrite, and ammonia;
  (d) a water soluble amine; and
  (e) an oxidizing agent.

And in yet another aspect, the invention is a chemical conversion coating solution that is commercially practical for producing an oxide film cobalt conversion coating on a metal substrate used in non-aircraft/aerospace applications, the solution comprising an aqueous reaction solution prepared by reacting the following starting materials:
  (a) a cobalt-II salt;
  (b) one or more inorganic complexing agents selected from the group consisting of a soluble metal carboxylate, a soluble metal nitrite, and ammonia;
  (c) a water soluble amine; and
  (d) an oxidizing agent.

BRIEF DESCRIPTION OF THE DRAWINGS

The figures are photomicrographs of images produced by a scanning electron microscope of improved cobalt conversion coatings made by the present process on aluminum alloy test panels. Thus, FIGS. 1–6 show cobalt conversion coatings formed by a 20 minute immersion in a typical cobalt coating aqueous reaction solution at 140° F. The cobalt conversion coatings formed by the present improved process are cobalt oxide and aluminum oxide mixed structures formed by oxidizing the surface of the substrate.

FIG. 1 is a photomicrograph at 5,000×magnification of a test panel showing a cobalt conversion coating 510 of the invention. The photomicrograph is a top view of the upper surface of oxide coating 510. The top of oxide coating 510 is porous and has a sponge-like appearance as shown in FIG. 1. This test panel was immersed in the cobalt conversion coating solution for 20 minutes. The white bar is a length of 1 micron. The roundish objects are unidentified impurities on the surface of the oxide coating.

FIG. 2 is a photomicrograph at 25,000×magnification of a test panel showing a cobalt conversion coating 510 of the invention. The photomicrograph is a top view of the upper surface of oxide coating 510. The white bar is a length of 1 micron.

FIG. 3 is a photomicrograph at 50,000×magnification of a test panel showing a cobalt conversion coating 510 of the invention. The photomicrograph is a top view of the upper surface of oxide coating 510. The white bar is a length of 100 nanometers.

FIG. 4 is a photomicrograph at 5,000×magnification of a test panel showing a side view of a fractured cross section of a cobalt conversion coating 520 of the invention. The fractured cross section of the aluminum alloy substrate of the test panel is indicated by reference numeral 522. To make the photomicrographs of FIGS. 4, 5, and 6, the test panel was bent and broken off to expose a cross section of oxide coating 520. The white bar is a length of 1 micron.

FIG. 5 is a photomicrograph at 25,000×magnification of a test panel showing a side view of a fractured cross section of a cobalt conversion coating 520 of the invention. The white bar is a length of 1 micron.

FIG. 6 is a photomicrograph at 50,000×magnification of a test panel showing a side view of a fractured cross section of a cobalt conversion coating 520 of the invention. The white bar is a length of 100 nanometers.

DESCRIPTION OF THE PREFERRED EMBODIMENTS

Historical Review And Background

Figure 1:
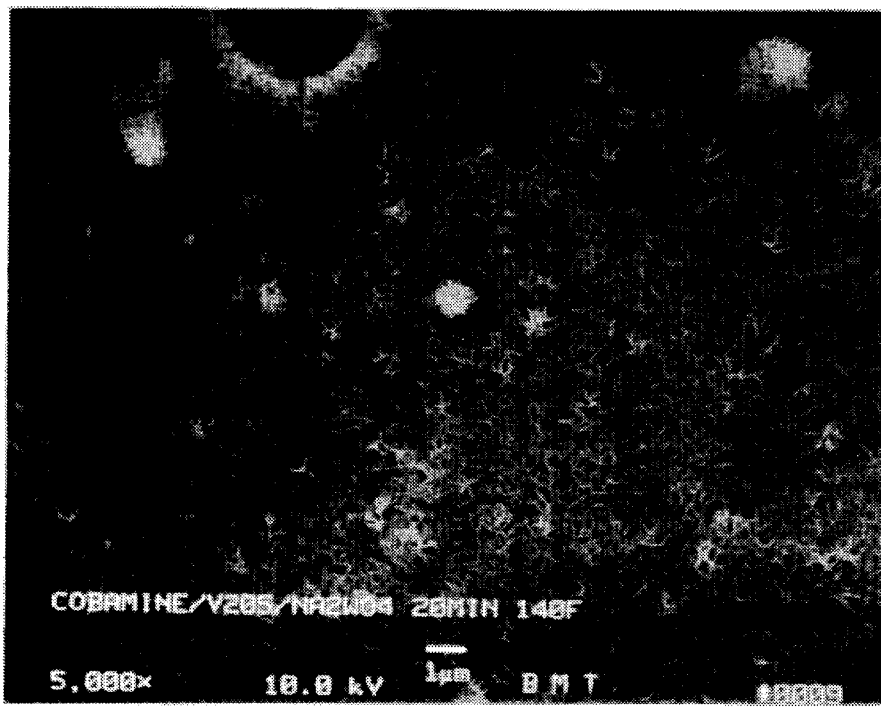
FIGS. 1–6 are photomicrographs (where the scanning electron microscope operated at 10 kV) of aluminum alloy 2024-T3 test panels having cobalt conversion coatings made by the invention and then given a post conversion treatment in a solution containing vanadium pentoxide and sodium tungstate (described below).
Figure 2:
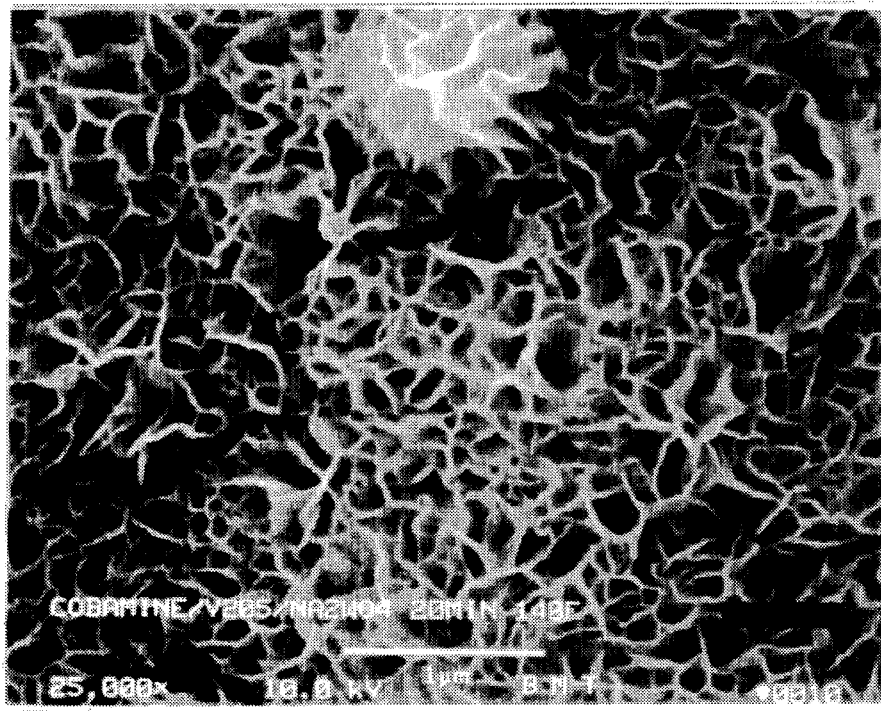
Figure 3:
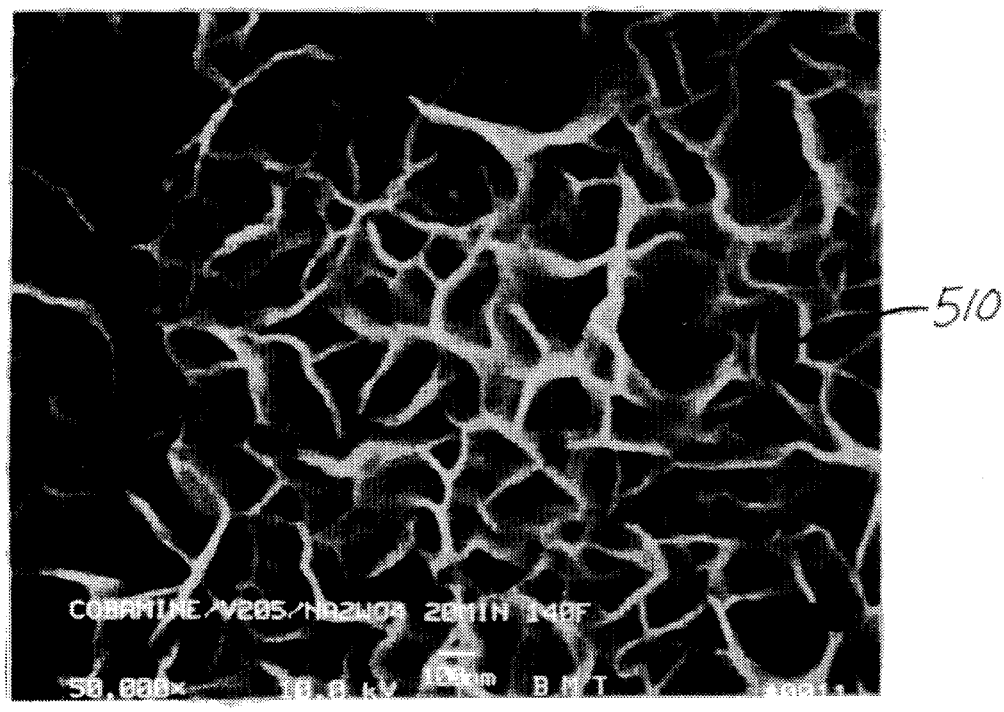
Figure 4:
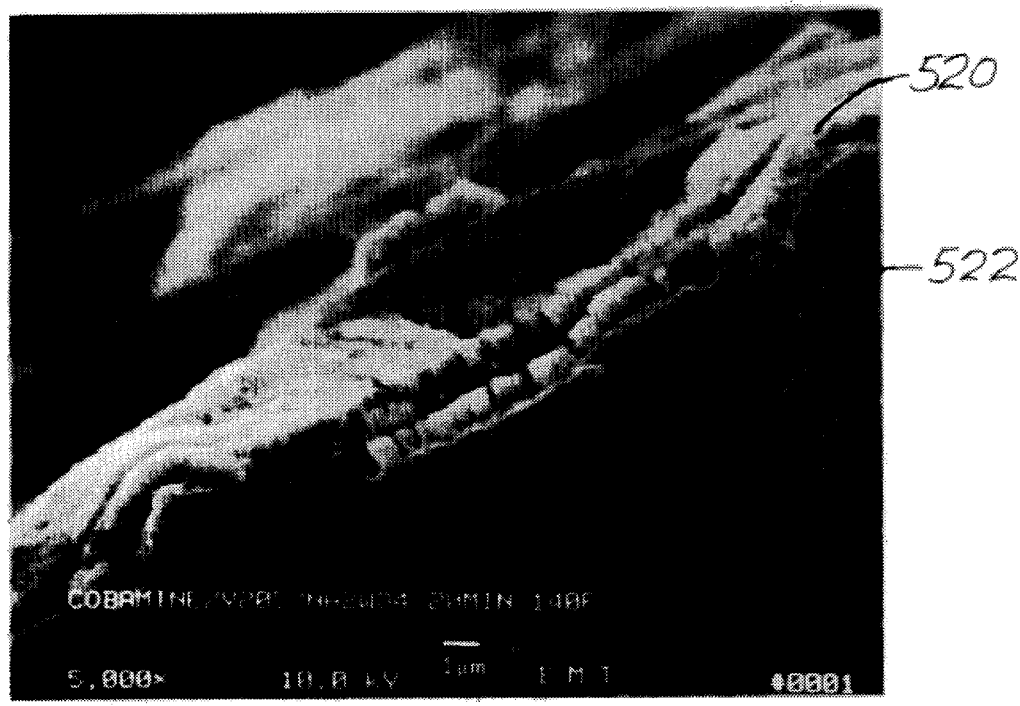
Figure 5:
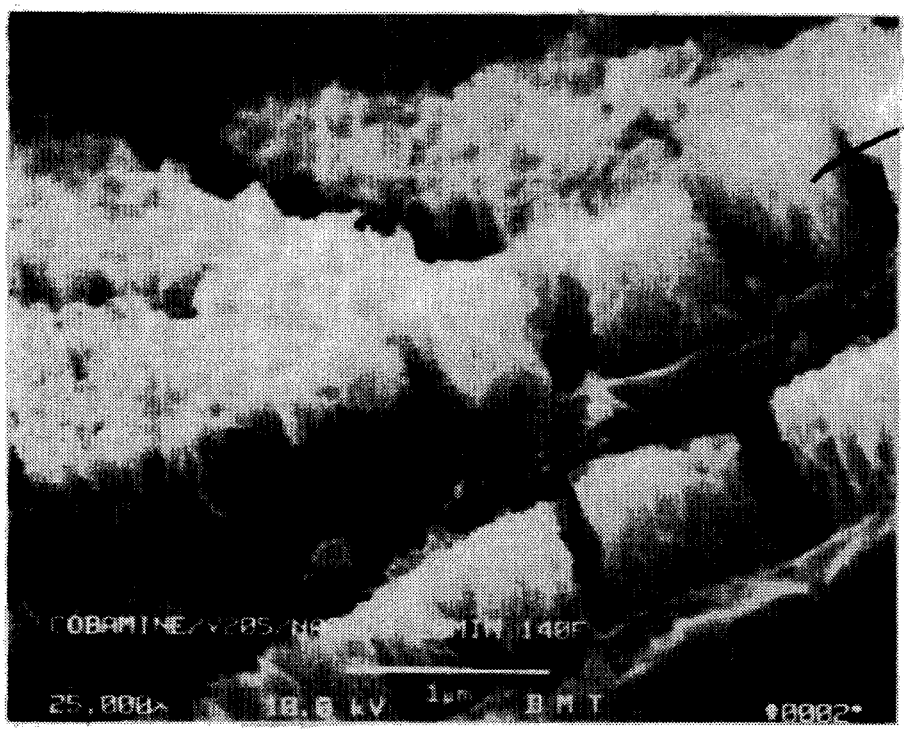
Figure 6:
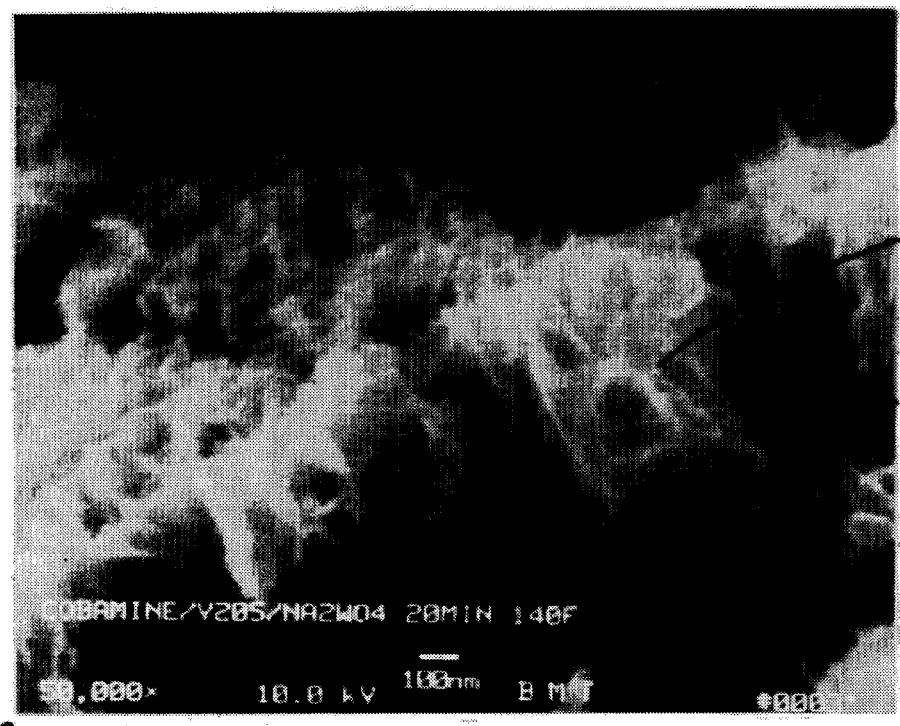

First, a considerable amount of empirical research was conducted in order to arrive at the invention described in the first patent application Ser. No. 07/525,800 filed May 17, 1990, now U.S. Pat. No. 5,298,092 issued Mar. 29, 1994. Many multivalent compounds were investigated, used either by themselves or in combination with alkalies, acids, or fluorides. Among these compounds were vanadates, molybdates, cerates, ferrates and a variety of borates. While film deposition of compounds containing these elements on aluminum alloy substrates is achieved, none afforded any appreciable corrosion protection nor paint adhesion.

A significant increase in corrosion protection was observed, however, when aluminum substrates were immersed in aqueous solutions of simple cobalt-II ($Co^{2+}$) salts heated to 180° F. This led to an investigation of a number of cobalt-II and cobalt-III ($Co^{3+}$) reactions, in particular as described in application Ser. No. 07/525,800 filed May 17, 1990, now U.S. Pat. No. 5,298,092 issued Mar. 29, 1994, and that patent is incorporated herein by reference.

In that invention, a stream of air is drawn for several hours through an aqueous solution containing a cobalt-II salt, $CoX_2$ where $X=Cl$, $Br$, $NO_3$, $CN$, $SCN$, $\frac{1}{3}PO_4$, $\frac{1}{2}SO_4$, $C_2H_3O_2$, or $\frac{1}{2}CO_3$, and the corresponding ammonium salt $NH_4X$, in the presence of ammonia to form a cobalt-III hexammine coordination complex. For example,

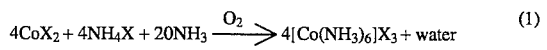

$$4CoX_2 + 4NH_4X + 20NH_3 \xrightarrow{O_2} 4[Co(NH_3)_6]X_3 + water \quad (1)$$

The above general reaction (1) is described in application Ser. No. 07/525,800 filed May 17, 1990, now U.S. Pat. No. 5,298,092 issued Mar. 29, 1994. The use of ammonia was employed to make the 3-valent cobalt hexammine complex.

Further research in this area has now resulted in substantial process improvements with respect to bath chemistries having a long bath life in service and an improvement in the coating performance. Salt spray corrosion resistance testing in accordance with ASTM B117 gave 336 hours (14 days) of salt spray corrosion resistance.

In the second patent application Ser. No. 07/621,132 filed Nov. 30, 1990, further research revealed that when 2-valent cobalt salts are dissolved into an aqueous solution of $MeNO_2$ (where Me=Na, K, or Li) (alkali metal ions), in the presence of an oxidizing agent, such as $H_2O_2$, then 3-valent cobalt nitrite complexes are formed:

$$2CoX_2 + 12MeNO_2 + H_2O_2 \longrightarrow 2Me_3[Co(NO_2)_6] + \qquad (2)$$

$$4MeX + 2MeOH$$

where X=Cl, Br, $NO_3$, CN, SCN, $\frac{1}{3}PO_4$, $\frac{1}{2}SO_4$, $C_2H_3O_2$, or $\frac{1}{2}CO_3$. From an environmental standpoint, the cyanide and thiocyanate salts are not preferred. In particular, the following bath chemistries were prepared and tested:

$$2Co(NO_3)_2 \cdot 6H_2O + 12NaNO_2 + H_2O_2 \longrightarrow \qquad (3)$$

$$2Na_3[Co(NO_2)_6] + 4NaNO_3 + 2NaOH$$

$$2Co(NO_3)_2 \cdot 6H_2O + 12KNO_2 + H_2O_2 \longrightarrow \qquad (4)$$

$$2K_3[Co(NO_2)_6] + 4KNO_3 + 2KOH$$

$$2Co(CH_3COO)_2 \cdot 4H_2O + 12NaNO_2 + H_2O_2 \longrightarrow \qquad (5)$$

$$2Na_3[Co(NO_2)_6] + 4CH_3COONa + 2NaOH$$

$$2CoCl_2 \cdot 6H_2O + 12NaNO_2 + H_2O_2 \longrightarrow \qquad (6)$$

$$2Na_3[Co(NO_2)_6] + 4NaCl + 2NaOH$$

These 3-valent cobalt nitrite complexes were found to produce brightly iridescent oxide coatings on aluminum substrates.

In the cobalt hexanitrite chemistry described above, cobalt coordination complexes are formed where the portion of the complex which includes the legand (the bracketed portion in equations (2)–(6)) is negatively charged, i.e., $$[Co(NO_2)_6]^{3-} \qquad (7)$$

and the complete complex is $$Me_{3[Co(NO2)6]} \qquad (8)$$

where Me corresponds to Na, K, or Li (alkali metal ions).

In the third patent application Ser. No. 07/732,568 filed Jul. 19, 1991, further research into cobalt-III hexammine complexes produced a significant processing advantage when ammonium hydroxide was replaced with ammonium acetate, $CH_3COONH_4$, i.e., $$4CoX_2 + 4NH_4X + 20CH_3COONH_4 \xrightarrow{O_2} \qquad (9)$$

$$4[Co(NH_3)_6]X_3 + 20\ CH_3COOH + water$$

where X=Cl, Br, $NO_3$, CN, SCN, $\frac{1}{3}PO_4$, $\frac{1}{2}SO_4$, $C_2H_3O_2$, or $\frac{1}{2}CO_3$.

A further improvement with regard to color consistency of the oxide coating was made when the associated ammonium salt $NH_4X$ in equation (9) was replaced with metal nitrate salts such as $Mg(NO_3)_2 \cdot 6H_2O$, $Ca(NO_3)_2 \cdot 6H_2O$, $NaNO_3$, $KNO_3$, or $LiNO_3$, i.e., $$4CoX_2 + 4NH_4X + 20CH_3COONH_4 \xrightarrow{O_2} \qquad (10)$$

$$4[Co(NH_3)_6]X_3 + 20CH_3COOH + water$$

where X=Cl, Br, $NO_3$, CN, SCN, $\frac{1}{3}PO_4$, $\frac{1}{2}SO_4$, $C_2H_3O_2$, or $\frac{1}{2}CO_3$.

The preferred reaction was found to involve cobalt nitrate as shown below:

$$4Co(NO_3)_2 \cdot 6H_2O + 2Mg(NO_3)_2 \cdot 6H_2O + \qquad (11)$$

$$24NH_4C_2H_3O_2 \xrightarrow{O_2} 4[Co(NH_3)_6](NO_3)_3 +$$

$$2Mg(CH_3COO)_2 + 20CH_3COOH + water$$

In the fourth patent application Ser. No. 07/903,853 filed Jun. 25, 1992, it was stated that the research advances described up to that point involved conversion coatings formed from the reaction of a 2-valent cobalt salt, such as cobalt nitrate with ammonium acetate to form a 3-valent cobalt complex. The resultant coatings were of high quality with regard to defined performance criteria; however, the bath lives of solutions utilizing ammonium acetate were rather short, i.e., on the order of 30 to 40 days. The desire to extend the bath life was the basis for further research.

During testing of the ammonium acetate complexed cobalt solution (Equation (11)), it was noticed that after several weeks of normal tank operation the coating weights on aluminum alloy substrates would gradually drop off and the color intensity would become lighter. In order to compensate for this, ever increasing immersion times were required. It was also noticed that a gradual solution appearance change would occur over time, from a dark brown to wine red color. Analysis finally established that a competing reaction was taking place over time, where the acetate in the complex $$[CO(C_2H_2O_2)_6]^3 \qquad (12)$$

would gradually be replace by an ammonia to form the complex $$[Co(NH^3)_6]^{3+} \qquad (13)$$

Notice the valence change in these bracketed ionic species.

In an effort to solve this problem, it was discovered, in accordance with the fourth patent application, that the substitution of a metal acetate, such as $Na(C_2H_3O_2) \cdot 3H_2O$, $Mg(C_2H_3O_2)_2 \cdot 4H_2O$ or $Ca(C_2H_3O_2)_2 \cdot 2H_2O$, for the $NH_4C_2H_3O_2$ in equation (11) would eliminate the above competing reactions described in conjunction with complexes (12) and (13), and result in the same strong colored coatings as the original ammonium acetate solutions. Sodium acetate was the most preferred metal carboxylate. Other metal carboxylates such as zinc, lithium, potassium, and manganese acetate would work but were not preferred. The typical reactions were:

$$2Co(C_2H_3O_2)_2 \cdot 4H_2O + 3Mg(C_2H_3O_2)_2 \cdot 4H_2O + 2HC_2H_3O_2 \rightarrow Mg_3 \\ [Co(C_2H_3O_2)_6]_2 + 21H_2O \qquad (14)$$

$$Co(C_2H_3O_2)_2 \cdot 4H_2O + 3\ Ca(C_2H_3O_2)_2 \cdot H_2O + \frac{1}{2}O_2 + 2HC_2H_3O_2 \rightarrow Ca_3 \\ [Co(C_2H_2O_2)_6]_2 + 21\ H_2O \qquad (15)$$

$$Co(C_2H_3O_2)_2 \cdot 4H_2O + 3Na(C_2H_3O_2) \cdot 3H_2O + \frac{1}{4}O_2 + HC_2H_3O_2 \rightarrow Na_3 \\ [Co(C_2H_3O_2)_6] + 13\frac{1}{2}H_2O \qquad (16)$$

Description Of The Improved Cobalt Chemical Conversion Processes

The present invention exhibits improvements with respect to the processes described in the earlier related patent applications above: Ser. No. 07/525,800 (patent application #1), Ser. No. 07/621,132 (patent application #2), Ser. No. 07/732,568 (patent application #3), and Ser. No. 07/903,853 (patent application #4). The improvements are a higher bath stability and a higher corrosion resistance performance exhibited by coated aluminum alloy substrates. As a consequence of the higher bath stability, the bath life is longer.

Regarding the improved bath stability, the bath of the present invention has no detectable decay rate after six months of production use. The decay rate is measured by sludge formed in the bath. The bath of the present invention has no sludge in the bath after six months of production use. This is a significant improvement because the baths of the four earlier patent applications have detectable decay rates, they form sludge, and they have bath lives of 2to 3 months in production use. Furthermore, the present bath performance effectiveness has not decreased in six months of production use. Another feature of the bath is that the constituents are replenishable. A six-month bath life is considered a minimum for a commercially practical service life in the aircraft/aerospace industry (for example, for treating aircraft parts). Thus, the present invention is a commercially practical process and a commercially practical bath.

Regarding the improved corrosion resistance performance, the present coated aluminum alloy substrates exhibit an increased level 3 to 4 weeks of corrosion resistance when tested in a standard salt spray test, ASTM B117, while also exhibiting technically acceptable level of paint adhesion when tested in accordance with the tests specified in applicable paint specifications. This is a significant improvement because the best coated aluminum alloy substrates of the four earlier patent applications would exhibit 2 weeks of corrosion resistance in the salt spray test.

In the previous processes, the complexing agent was either ammonia (ammonium hydroxide $NH_4OH$), or nitrites (such as sodium nitrite $NaNO_2$), or acetates (such as magnesium acetate or sodium acetate). In the present improvement, the complexing agents that were previously used are partially replaced with a new complexing agent. The new complexing agent is a water soluble amine. The preferred water soluble amines for this purpose are ethylenediamine, triethanolamine (TEA), and ethylenediaminetetraacetic acid (EDTA). The most preferred water soluble amine is triethanolamine (TEA).

Using a water soluble amine as an additional complexing agent, the completing will take place with a cobalt-II salt in an aqueous solution to form certain hexacoordinated cobalt-III complexes, described below, which were not present in the baths described in the previous patent applications #1, #2, #3, and #4. For aircraft/aerospace applications (for example, for treating aircraft parts), the goal is to produce conversion coatings exhibiting maximum corrosion resistance performance while maintaining acceptable levels of paint adhesion performance. In preparing the improved cobalt conversion aqueous reaction solution or bath for such aircraft/aerospace applications, the chemical starting materials include a water soluble amine, and/or an ammonium salt (such as ammonium nitrate $NH_4NO_3$), and/or an acetate complexing agent (such as sodium acetate, magnesium acetate, ammonium acetate), and/or a nitrite complexing agent (such as sodium nitrite $NaNO_2$), and/or ammonia (ammonium hydroxide). Another starting material in preparing the improved cobalt conversion bath for aircraft/aerospace applications, is an oxidizer (such as hydrogen peroxide $H_2O_2$, potassium permanganate $KMnO_4$, or air oxygen). The preferred oxidizer is hydrogen peroxide $H_2O_2$.

For non-aircraft/aerospace applications (for example, for treating marine hardware parts), the goal is to produce conversion coatings exhibiting maximum paint adhesion performance while maintaining acceptable levels of corrosion resistance performance. In preparing the improved cobalt conversion aqueous reaction solution or bath for such non-aircraft/aerospace applications, the chemical starting materials include a water soluble amine, and/or an acetate completing agent (such as sodium acetate, magnesium acetate, ammonium acetate), and/or a nitrite complexing agent (such as sodium nitrite $NaNO_2$), and/or ammonia. Another starting material in preparing the improved cobalt conversion bath for non-aircraft/aerospace applications is an oxidizer (such as hydrogen peroxide $H_2O_2$, potassium permanganate $KMnO_4$, or air oxygen). The preferred oxidizer is hydrogen peroxide $H_2O_2$.

The improved cobalt conversion baths (i.e., the baths that are formed after the chemical reactions between the starting materials are substantially completed) are a complicated system possibly containing some unreacted starting materials, various chemical reaction by-products, and the reaction products (including various cobalt-III complexes).

As a comparative test, conversion coatings on aluminum alloy substrates have been formed using a bath where a water soluble amine (such as TEA) was used as the sole complexing agent to create cobalt-III complexes in the bath (i.e., without using any acetate, the nitrite, or the ammonia complexing agents). Conversion coatings were formed by that bath, but the conversion coatings were not technically acceptable coatings. Thus, it is a requirement of the present improved process to use a mixture of a water soluble amine as a complexing agent and at least one other complexing agent of the aforementioned inorganic complexing agents in order to form an aqueous reaction solution which includes various cobalt-III complexes, possibly some unreacted starting materials, and various chemical reaction by-products. This improved bath achieves the goal of having at least six months of service life in production use (thus making the process commercially viable) and achieves the goal of producing technically acceptable conversion coatings on aluminum alloy substrates.

The identities of all of the chemical constituents in the improved process baths and their quantities are not known with scientific certainty because the baths are a mixture of many constituents and, at this time, qualitative and quantitative analyses of the mixture, which require a long time and are difficult to perform, have not been completed. Furthermore, at this time the chemical mechanism by which the improved solutions perform their function is not understood, but complexing with cobalt to form cobalt-III hexacoordinated structures is believed to occur as shown below.

1. When Employing Nitrite and TEA

The primary cobalt-III complex is believed to be $Na_2[Co(NO_2)_3(TEA)]$. The chemical structure of this complex is believed to be:

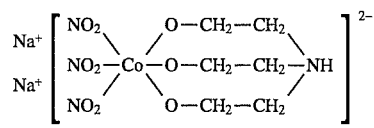

2. When Employing Acetate and TEA

The primary cobalt-III complex is believed to be $Na_2[Ca(C_2H_3O_2)_3(TEA)]$. The chemical structure of this complex is believed to be:

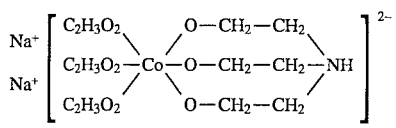

3. When Employing Ammonia and TEA

The primary complex is believed to be [Co(NH$_3$)$_3$(TEA)]NO$_3$. The chemical structure of this complex is believed to be:

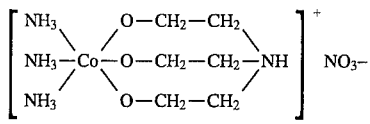

Chemical Reactant Selection (Starting Materials)

The most critical parameters affecting performance of the present cobalt conversion coatings with respect to paint adhesion and corrosion resistance were found to be selection of the reactants and their concentrations in solution. It was found that coating performance was affected foremost by these factors rather than bath temperature or immersion time, although temperature and immersion time do impart their effects over larger variations of these parameters.

It is known that with respect to surface treatments of aluminum, paint adhesion and corrosion resistance are divergent properties. In other words, maximizing paint adhesion usually occurs at the expense of corrosion performance and vice-versa. This surface treatment behavior was also found to exist with cobalt conversion coatings.

Regarding reactant selection, a wide variety of cobalt salts are operable for cobalt complexing. Among the cobalt-II salts that are operable in water solution are CoX$_2$ where X is one or more selected from the group consisting of Cl, Br, NO$_3$, CN, SCN, ⅓PO$_4$, ½SO$_4$, C$_2$H$_3$O$_2$, or ½CO$_3$. From an environmental standpoint, the cyanide and thiocyanate salts are not preferred. Furthermore, other cobalt-II salts may be used if they possess a minimum solubility in water.

For conversion coatings to be used in aircraft/aerospace applications, an ammonium salt is a necessary starting material. The preferred ammonium salts are ammonium nitrate and ammonium acetate. The most preferred ammonium salt is ammonium nitrate, since cobalt salts tend to have a strong reaction affinity for nitrates. For conversion coatings to be used in non-aircraft/aerospace applications, the ammonium salt is not used as a starting material.

An inorganic complexing agent is also a necessary starting material. The inorganic complexing agent may be a metal nitrite salt MeNO$_2$, where Me is one or more selected from the group consisting of Na, K, or Li, and/or the inorganic complexing agent may be a soluble metal carboxylate having from 1 to 5 carbon atoms, and/or the inorganic complexing agent may be ammonia. Regarding metal carboxylates, the carboxylate salts of Ca, Mg, and Na are preferred, with the Na carboxylate being most preferred while Zn, Li, K, and Mn may also be used. Metal salts of acetic acid are preferred with sodium acetate being most preferred. The limitation on using carboxylates other than the acetates is water solubility and the ability to form cobalt-III complexes.

A water soluble amine (an organic complexing agent) is necessary. The preferred water soluble amines for this purpose are ethylenediamine, triethanolamine (TEA), and ethylenediaminetetraacetic acid (EDTA). The most preferred water soluble amine is triethanolamine (TEA).

A preferred chemical additive is an oxidizer, preferably hydrogen peroxide, H$_2$O$_2$. The function of the oxidizer is to oxidize the cobalt-II ions in solution to cobalt-III ions. The stream of air flowing into the tank also functions as an oxidizer, but the hydrogen peroxide increases the rate of oxidation of the cobalt-II ions in solution to cobalt-III ions and therefore is useful for commercial practice of the invention in that the solution becomes operational in a shorter period of time.

As discussed above, the improved aqueous reaction solution or conversion bath is a system wherein it is necessary to have all of the chemical constituents that result from the chemical reactions involving the starting materials. The resultant aqueous reaction solution containing many chemical constituents is needed in order to form technically acceptable oxide coatings.

To summarize, the necessary starting materials for aircraft/aerospace applications are the following:

1. A cobalt-II salt.
2. An ammonium salt.
3. An inorganic complexing agent (one or more of: metal carboxylates and/or metal nitrites and/or ammonia).
4. A water soluble amine (an organic complexing agent).
5. An oxidizing agent (such as H$_2$O$_2$, KMnO$_4$, or air oxygen).

And for non-aircraft/aerospace applications, the necessary starting materials are the following (note that the ammonium salt is not used):

1. A cobalt-II salt.
2. An inorganic complexing agent (one or more of: a metal carboxylates and/or metal nitrites and/or ammonia).
3. A water soluble amine (an organic complexing agent).
4. An oxidizing agent (such as H$_2$O$_2$, KMnO$_4$, or air oxygen).

The absence of any of the above necessary starting materials will result in a bath which will produce either no coating formation at all or coatings that do not meet corrosion resistance and paint adhesion performance requirements.

Chemical Concentrations, pH Control, Temperature, And Immersion Time

With respect to chemical concentrations, the concentration of dissolved cobalt-II salt used may be from about 0.01 mole per liter of final solution up to the saturation limit of the cobalt-II salt employed at 20° C. (68° F.). Preferably, the concentration of dissolved cobalt-II salt used may be from about 0.082 mole per liter of final solution to 0.10 mole per liter of final solution.

The concentration of the dissolved ammonium salt may be from about 0.03 to 2.5 moles per liter of final solution. Preferably, the concentration of dissolved ammonium salt used may be from about 0.92 mole per liter of final solution to 1.05 moles per liter of final solution.

The concentration of the dissolved metal nitrite salt may be from about 0.03 to 2.5 moles per liter of final solution. Preferably, the concentration of dissolved metal nitrite salt used may be from about 0.35 mole per liter of final solution up to 0.42 mole per liter of final solution.

The concentration of dissolved metal carboxylate may be from about 0.03 to 2.5 moles per liter of final solution. Preferably, the concentration of dissolved metal carboxylate used may be from about 0.33 mole per liter of final solution to 0.43 mole per liter of final solution.

The concentration of ammonium hydroxide (ammonia) may be from about 0.03 to 0.8 moles per liter of final solution. Preferably, the concentration of dissolved ammonia used may be from about 0.20 mole per liter of final solution to 0.25 mole per liter of final solution.

The concentration of the water soluble amine may be from about 0.03 to 0.25 mole per liter of final solution. Preferably, the concentration of the water soluble amine used may be from about 0.14 mole per liter of final solution to 0.17 mole per liter of final solution.

The pH of the bath may be from about 6.0 to 7.5 with 6.8 to 7.2 being preferred. The temperature of the bath may be from about 68° F. to 160° F; prolonged heating above 160° F. causes gradual decomposition of the cobalt-III hexacoordinated complex. The optimum temperature is 140±5° F. The immersion time may be from about 3 minutes to 60 minutes with the optimum immersion time at 15–30 minutes.

Examples Of The Improved Processes

The following examples provide specific details of the improved processes and the aqueous reaction solutions used therein. Example 1 below is a formulation for a nitrite-complexed cobalt conversion solution using TEA and nitrite mixed complexing. Example 1 represents the most preferred process for substrates used in aircraft/aerospace applications (for example, an aluminum or aluminum alloy commercial airplane part) where the goal is to produce conversion coatings exhibiting maximum corrosion resistance performance while maintaining acceptable paint adhesion performance.

EXAMPLE 1

| COMPONENT | MAKEUP PER LITER | CONTROL PER LITER |
| --- | --- | --- |
| Cobalt nitrate $Co(NO_3)_2 \cdot 6H_2O$ | 26 gm (0.089 mole) | 24–29 gm (0.082–0.10 mole) |
| Sodium nitrite $NaNO_2$ | 26 gm (0.38 mole) | 24–29 gm (0.35–0.42 mole) |
| Ammonium nitrate $NH_4NO_3$ | 79 gm (0.99 mole) | 74–84 gm (0.92–1.05 mole) |
| Triethanolamine (TEA) 80 wt % minimum | 26 ml (0.15 mole) | 24–29 ml (0.14–0.17 mole) |
| Hydrogen peroxide $H_2O_2$ 30 wt % | 8 ml (0.07 mole) | — |
| Water (deionized) | Balance | As required |
| Ammonium hydroxide | To adjust pH — | As required to maintain pH |
| Temperature | 100° F. ± 5° F. on makeup | 140° F. ± 5° F. operating |
| pH | — | 6.8–7.2 |
| Immersion time | — | 15–30 minutes |

Preferred Bath Preparation Sequence For Example 1

The preferred bath preparation sequence for Example 1 above (process for aircraft/aerospace applications) is as follows:

1. A stainless steel tank (containing an inert liner) fitted with air agitation plumbing and heating coils is filled to ¾ with deionized water at a temperature of about 100° F. Air agitation is commenced to a gentle roll. The tank may be equipped with a filter unit to remove any solid impurities (dust, aluminum silt, etc.) during processing.
2. Add and dissolve the required chemicals in the following order:
   (a) Ammonium nitrate.
   (b) Sodium nitrite.
   (c) Cobalt nitrate.
   (d) Triethanolamine (TEA).
3. The tank is filled to the final volume with deionized water. Air agitation of this solution is maintained. Let the solution react for 10 to 15 minutes.
4. Add the required amount of oxidizer, i.e., hydrogen peroxide $H_2O_2$ (30 weight % preferred), and let react for one hour. The preferred amount of $H_2O_2$ is about 8 to 10 ml of $H_2O_2$ per liter of final solution.
5. Heat the solution to preferably about 140° F. and let it react for an additional 4±0.5 hours.
6. Check the pH of the solution. If the pH is below 6.8, then add ammonium hydroxide to the solution while stirring vigorously to raise the pH to the preferred pH range of 6.8 to 7.2.
7. Optionally but preferably, a second stainless steel tank (to be used for a post conversion treatment step in accordance with Example 5 below) is prepared with air agitation plumbing and heating coils and is filled ¾ with deionized water. This post-cobalt conversion coating step serves as a corrosion resistance promoter. The tank is left unheated while adding the required chemicals.
8. A quantity of vanadium pentoxide and a quantity of sodium tungstate are added to the second tank and dissolved. The preferred amount of vanadium pentoxide is about 2 gm (0.011 mole) per liter of final solution. The preferred amount of sodium tungstate is about 8 gm (0.024 mole) per liter of final solution. Stir as necessary to dissolve.
9. The second tank is then filled to final volume with deionized water and heated to 140°±5° F. No further air agitation is needed.

Example 2 below is a formulation for acetate complexed cobalt conversion solutions using TEA and acetate mixed complexing. Example 2 represents a preferred process for substrates used in non-aircraft/aerospace applications (for example, an aluminum or aluminum alloy marine hardware part) where the goal is to produce conversion coatings exhibiting maximum paint adhesion performance while maintaining acceptable levels of corrosion resistance performance.

EXAMPLE 2

| COMPONENT | MAKEUP PER LITER | CONTROL PER LITER |
| --- | --- | --- |
| Cobalt nitrate $Co(NO_3)_2 \cdot 6H_2O$ | 33 gm (0.11 mole) | 30–35 gm (0.10–0.12 mole) |
| Magnesium acetate (Preferred) $Mg(C_2H_3O_2)_2 \cdot 4H_2O$ or | 85 gm (0.40 mole) | 80–90 gm (0.37–0.42 mole) |
| Calcium acetate $Ca(C_2H_3O_2)_2 \cdot 2H_2O$ or | 70 gm (0.36 mole) | 65–75 gm (0.33–0.39 mole) |
| Sodium acetate $Na(C_2H_3O_2) \cdot 3H_2O$ | 54 gm (0.40 mole) | 50–58 gm (0.37–0.43 mole) |
| Triethanolamine (TEA) 80 wt % minimum | 26 ml (0.15 mole) | 24–30 ml (0.14–0.17 mole) |
| Hydrogen peroxide $H_2O_2$ 30 wt % | 10 ml (0.088 mole) | As required periodically to maintain coating color |
| Operating temperature | 100° F. | 140–145° F. |
| Bath pH | — | 6.8–7.2 |
| Immersion time | — | 15–30 minutes |

Preferred Bath Preparation Sequence For Example 2

The preferred bath preparation sequence for Example 2 above (process for non-aircraft/aerospace applications) is similar to the above preparation sequence for Example 1, but Step 2 for Example 2 is different as follows:

2. Add and dissolve the required chemicals in the following order:
   (a) Magnesium acetate (or calcium acetate or sodium acetate).
   (b) Triethanolamine (TEA).
   (c) Cobalt nitrate.

Example 3 below is a formulation for acetate complexed cobalt conversion solutions using TEA and ammonium acetate mixed complexing. Example 3 represents another preferred process for aircraft/aerospace applications where the goal is to produce conversion coatings exhibiting maximum corrosion resistance performance while maintaining acceptable levels of paint adhesion performance.

EXAMPLE 3

| COMPONENT | MAKEUP PER LITER | CONTROL PER LITER |
|---|---|---|
| Cobalt nitrate $Co(NO_3)_2 \cdot 6H_2O$ | 26 gm (0.089 mole) | 24–29 gm (0.082–0.10 mole) |
| Ammonium acetate $NH_4C_2H_3O_2$ | 85 gm (1.1 moles) | 80–90 gm (1.0–1.2 moles) |
| Ammonium nitrate $NH_4NO_3$ | 79 gm (0.99 mole) | 74–84 gm (0.92–1.05 moles) |
| Triethanolamine (TEA) 80 wt % minimum | 26 ml (0.15 mole) | 24–29 ml (0.14–0.17 mole) |
| Hydrogen peroxide $H_2O_2$ 30 wt % | 8 ml (0.07 mole) | — |
| Ammonium hydroxide | To adjust pH | As required to maintain pH |
| pH | — | 6.8–7.2 |
| Immersion time | — | 15–30 minutes |

Example 4 below is a formulation for ammonia complexed cobalt conversion solutions using TEA and ammonia mixed complexing. Example 4 represents another preferred process for aircraft/aerospace applications where the goal is to produce conversion coatings exhibiting maximum corrosion resistance performance while maintaining acceptable levels of paint adhesion performance.

EXAMPLE 4

| COMPONENT | MAKEUP PER LITER | CONTROL PER LITER |
|---|---|---|
| Cobalt nitrate $Co(NO_3)_2 \cdot 6H_2O$ | 26 gm (0.089 mole) | 24–29 gm (0.082–0.10 mole) |
| Ammonium nitrate $NH_4NO_3$ | 79 gm (0.99 mole) | 74–84 gm (0.92–1.05 mole) |
| Triethanolamine (TEA) 80 wt % minimum | 26 ml (0.15 mole) | 24–29 ml (0.14–0.17 mole) |
| Ammonium hydroxide $NH_4OH$ 30 wt % solution | 26 ml (0.22 mole) | 24–29 ml (0.20–0.25 mole) |
| Hydrogen peroxide $H_2O_2$ 30 wt % | 8 ml (0.07 mole) | — |
| Water (deionized) | Balance | As required |
| Temperature | 100° F. ± 5° F. on makeup | 140° F. ± 5° F. operating |
| pH | — | 6.8–7.2 |
| Immersion time | — | 15–30 minutes |

Post Conversion Treatment Solution

There has been a further technical improvement in the post conversion treatment that contributes to the improved corrosion resistance performance of the cobalt conversion coatings. Example 5 below is a preferred formulation for the post conversion coat treatment for TEA-nitrite complexed conversion coatings and for TEA-acetate mixed complexed conversion coatings.

EXAMPLE 5

| COMPONENT | MAKEUP PER LITER | CONTROL PER LITER |
|---|---|---|
| Vanadium Pentoxide $V_2O_5$ (preferred) | 2 gm (0.011 mole) | 1.5–3.0 gm (0.0082–0.016 mole) |
| Sodium Tungstate $Na_2WO_4 \cdot 2H_2O$ | 8 gm (0.024 mole) | 6.5–10.0 gm (0.020–0.030 mole) |
| Temperature | 140° F. | 140° F. |
| Immersion Time | — | 3–5 minutes |
| pH | — | 6.8–7.2 |

Preferred Cobalt Conversion Coating Process Flow The preferred cobalt conversion coating process flow sequence may be summarized as follows:

(1) PRECLEAN IF REQUIRED
(2) MASK AND RACK AS REQUIRED
(3) ALKALINE CLEAN AND RINSE
(4) DEOXIDIZE AND RINSE
(5) FORM COBALT CONVERSION COATING
(6) IMMERSION RINSE
(7) POST CONVERSION TREATMENT STEP
(8) RINSE
(9) DRY

General Notes With Respect To The Above Process Flow

The cobalt conversion coating should be applied after all trimming and fabrication have been completed. Parts, where solution entrapment is possible, should not be subjected to immersion alkaline cleaning or immersion deoxidizing; manual cleaning and manual deoxidizing procedures should be used to obtain water break-free surfaces before applying cobalt conversion treatment. A water break-free surface is a surface which maintains a continuous water film for a period of at least 30 seconds after having been sprayed or immersion rinsed in clean water at a temperature below 100° F.

Thorough rinsing and draining throughout processing is necessary as each solution should be completely removed to avoid interference with the performance of the next solution in the sequence. Parts should be processed from one step to the next without delay and without allowing the parts to dry. When it is necessary to handle wet parts, wear clean latex rubber gloves. After conversion coating, handle dry parts only with clean fabric gloves. For processing systems that require part clamping, the number and size of contact points should be kept to a minimum as necessary for adequate mechanical support.

Precleaning

Vapor degrease may be performed in accordance with Boeing Process Specification BAC 5408, emulsion clean in accordance with Boeing Process Specification BAC 5763, or solvent clean in accordance with Boeing Process Specification BAC 5750 if parts are greasy or oily. Parts with open faying surfaces or spot-welded joints where solution entrapment is possible should be immersed in cold water (or in hot and cold water) for 2 minutes after precleaning.

Masking And Racking

Areas that do not require cobalt conversion coatings should be masked with maskants. Dissimilar metal inserts (except chromium, nickel or cobalt alloy or plating, CRES, or titanium) and non-aluminum coated plasma flame sprayed area should be masked off.

Alkaline Cleaning

Alkaline clean and rinse may be performed in accordance with Boeing Process Specification BAC 5744 or BAC 5749, except for parts with open faying surfaces or spot welded joints, in which case, rinsing should be for at least 10 minutes using agitation with multiple immersions (a minimum of four times) followed by manual spray rinsing as required to prevent solution entrapment.

Deoxidizing

Deoxidize and rinse may be performed in accordance with Boeing Process Specification BAC 5765 except for parts where solution entrapment is possible, which parts may be rinsed using the method described above under "Alkaline Cleaning." Castings may be deoxidized by either of the following methods:

a. Deoxidize in accordance with Boeing Process Specification BAC 5765, Solution 37, 38 or 39.

b. Dry abrasive blast castings in accordance with Boeing Process Specification BAC 5748, Type II, Class 1 and rinse.

Other Methods Of Application

The above formulations illustrate producing cobalt conversion coatings by immersion application. The same principles apply to producing the conversion coating by manual application and by spray application.

The Best Modes

For substrates for use in aircraft/aerospace applications, the best mode presently contemplated for carrying out the invention is the combination of Example 1 and Example 5. For substrates for use in non-aircraft/aerospace applications, the best mode presently contemplated for carrying out the invention is the combination of Example 2 and Example 5.

The patents, specifications, and other publications referenced above are incorporated herein by reference.

Unless indicated otherwise, in stating a numerical range for a compound or a temperature or a time or other process matter or property, such a range is intended to specifically designate and disclose the minimum and the maximum for the range and each number, including each fraction and/or decimal, between the stated minimum and maximum for the range. For example, a range of 1 to 10 discloses 1.0,1.1,1.2 ... 2.0,2.1,2.2, ... and so on, up to 10.0. Similarly, a range of 500 to 10.00 discloses 500,501,502, ... and so on, up to 1000, including every number and fraction or decimal therewithin. "Up to x" means "x" and every number less than "x", for example, "up to 5" discloses 0.1,0.2,0.3, . . ., and so on up to 5.0.

As will be apparent to those skilled in the art to which the invention is addressed, the present invention may be embodied in forms other than those specifically disclosed above, without departing from the spirit or essential characteristics of the invention. The particular embodiments of the invention described above and the particular details of the processes described are therefore to be considered in all respects as illustrative and not restrictive. The scope of the present invention is as set forth in the appended claims rather than being limited to the examples set forth in the foregoing description. Any and all equivalents are intended to be embraced by the claims.

What is claimed is:

1. An improved process that is commercially practical for forming an oxide film cobalt conversion coating exhibiting corrosion resistance and paint adhesion properties on a substrate, wherein said substrate is aluminum or aluminum alloy, said process comprising the steps of:

(a) providing an oxide film forming cobalt conversion solution comprising an aqueous reaction solution containing a 3-valent cobalt complex prepared by reacting the following starting materials:

(1) a cobalt-II salt wherein said cobalt-II salt is $CoX_2$ where X=Cl,-Br, $NO_3$, CN, SCN, $\frac{1}{3}PO_4$, $\frac{1}{2}SO_4$, $C_2H_3O_2$, or $\frac{1}{2}CO_3$, (2) an ammonium salt wherein said ammonium salt is selected from the group consisting of ammonium nitrate nitrate and ammonium acetate;

(3) one or more inorganic complexing agents selected from the group consisting of a soluble metal carboxylate, a soluble metal nitrite, and ammonia;

(4) a water soluble amine wherein said water soluble amine is selected from the group consisting of ethylenediamine triethanolamine (TEA), and ethylenediaminetetraacetic acid (EDTA); and (5) an oxidizing agent; and (b) contacting said substrate with said aqueous reaction solution for a sufficient amount of time to oxidize the surface of said substrate, whereby said oxide film cobalt conversion coating is formed, thereby imparting corrosion resistance and paint adhesion properties to said substrate.

2. The process of claim 1 wherein said cobalt-II salt is cobalt nitrate.

3. The process of claim 1 wherein said ammonium salt is ammonium nitrate.

4. The process of claim 1 wherein said soluble metal carboxylate is selected from the group consisting of metal carboxylates having from 1 to 5 carbon atoms.

5. The process of claim 1 wherein said soluble metal carboxylate is selected from the group consisting of soluble metal salts of acetic acid.

6. The process of claim 1 wherein said soluble metal carboxylate is selected from the group consisting of soluble metal carboxylate salts of Ca, Mg, and Na.

7. The process of claim 1 wherein said soluble metal carboxylate is a soluble metal carboxylate salt of Na.

8. The process of claim 1 wherein said soluble metal carboxylate is sodium acetate.

9. The process of claim 1 wherein said soluble metal nitrite is $MeNO_2$, where Me is one or more selected from the group consisting of Na, K, or Li.

10. The process of claim 1 wherein said soluble metal nitrite is sodium nitrite.

11. The process of claim 1 wherein said water soluble amine is triethanolamine (TEA).

12. The process of claim 1 wherein said oxidizing agent is selected from the group consisting of $H_2O_2$, $KMnO_4$, and air oxygen.

13. The process of claim 1 wherein said oxidizing agent is hydrogen peroxide $H_2O_2$.

14. The process of claim 1 comprising the additional step of contacting said coated substrate with an aqueous post conversion treatment solution comprising a solution of vanadium pentoxide and sodium tungstate.

15. An improved process that is commercially practical for forming an oxide film cobalt conversion coating exhibiting corrosion resistance and paint adhesion properties on a substrate, wherein said substrate is aluminum or aluminum alloy, said process comprising the steps of:
   (a) providing an oxide film forming cobalt conversion solution comprising an aqueous reaction solution containing a 3-valent cobalt complex prepared by reacting the following starting materials:
      (1) a cobalt-II salt wherein said cobalt salt is $CoX_2$ where X=Cl, Br, $NO_3$, CN, SCN, $\frac{1}{3}PO_4$, $\frac{1}{2}SO_4$, $C_2H_3O_2$, or $\frac{1}{2}CO_3$;
      (2) one or more inorganic complexing agents selected from the group consisting of metal carboxylates, metal nitrites, and ammonia;
      (3) a water soluble amine wherein said water soluble amine is selected from the group consisting of etylenediamine, triethanolmine (TEA), and ethylenediaminetetraacetic acid (EDTA); and
      (4) an oxidizing agent; and
   (b) contacting said substrate with said aqueous reaction solution for a sufficient amount of time to oxidize the surface of said substrate, whereby said oxide film cobalt conversion coating is formed, thereby imparting corrosion resistance and paint adhesion properties to said substrate.

16. The process of claim 15 wherein said cobalt-II salt is cobalt nitrate.

17. The process of claim 15 wherein said soluble metal carboxylate is selected from the group consisting of metal carboxylates having from 1 to 5 carbon atoms.

18. The process of claim 15 wherein said soluble metal carboxylate is selected from the group consisting of soluble metal salts of acetic acid.

19. The process of claim 15 wherein said soluble metal carboxylate is selected from the group consisting of soluble metal carboxylate salts of Ca, Mg, and Na.

20. The process of claim 15 wherein said soluble metal carboxylate is a soluble metal carboxylate salt of Na.

21. The process of claim 15 wherein said soluble metal carboxylate is sodium acetate.

22. The process of claim 15 wherein said soluble metal nitrite is $MeNO_2$, where Me is one or more selected from the group consisting of Na, K, or Li.

23. The process of claim 15 wherein said soluble metal nitrite is sodium nitrite.

24. The process of claim 15 wherein said water soluble amine is triethanolamine (TEA).

25. The process of claim 15 wherein said oxidizing agent is selected from the group consisting of $H_2O_2$, $KMnO_4$, and air oxygen.

26. The process of claim 15 wherein said oxidizing agent is hydrogen peroxide $H_2O_2$.

27. The process of claim 15 comprising the additional step of contacting said coated substrate with an aqueous post conversion treatment solution comprising vanadium pentoxide and sodium tungstate.

28. A chemical conversion coating solution that is commercially practical for producing an oxide film cobalt conversion coating on a metal substrate, said solution comprising an aqueous reaction solution containing 3-valent cobalt complex prepared by reacting the following starting materials:
   (a) a cobalt-II salt wherein said cobalt-II salt is $CoX_2$ where X=Cl, Br, $NO_3$, CN, SCN, $\frac{1}{3}PO_4$, $\frac{1}{2}SO_4$, $C_2H_3O_2$, or $\frac{1}{2}CO_3$;
   (b) an ammonium salt wherein said ammonium salt is selected from the group consisting of ammonium nitrate and ammonium acetate;
   (c) one or more inorganic complexing agents selected from the group consisting of a soluble metal carboxylate, a soluble metal nitrite, and ammonia;
   (d) a water soluble amine wherein said water soluble amine is selected from the ground consisting of ethylenediamine, triethanolamine (TEA), and ethylenediaminetetraacetic acid (EDTA); and
   (e) an oxidizing agent.

29. The chemical conversion coating solution of claim 28 wherein said cobalt-II salt is cobalt nitrate.

30. The chemical conversion coating solution of claim 28 wherein said ammonium salt is ammonium nitrate.

31. The chemical conversion coating solution of claim 28 wherein said soluble metal carboxylate is selected from the group consisting of soluble metal carboxylates having from 1 to 5 carbon atoms.

32. The chemical conversion coating solution of claim 28 wherein said soluble metal carboxylate is selected from the group consisting of soluble metal salts of acetic acid.

33. The chemical conversion coating solution of claim 28 wherein said soluble metal carboxylate is selected from the group consisting of soluble metal carboxylate salts of Ca, Mg, and Na.

34. The chemical conversion coating solution of claim 28 wherein said soluble metal carboxylate is a soluble metal carboxylate salt of Na.

35. The chemical conversion coating solution of claim 28 wherein said soluble metal carboxylate is sodium acetate.

36. The chemical conversion coating solution of claim 28 wherein said soluble metal nitrite is $MeNO_2$, where Me is one or more selected from the group consisting of Na, K, or Li.

37. The chemical conversion coating solution of claim 28 wherein said soluble metal nitrite is sodium nitrite.

38. The chemical conversion coating solution of claim 28 wherein said water soluble amine is triethanolamine (TEA).

39. The chemical conversion coating solution of claim 28 wherein said oxidizing agent is selected from the group consisting of $H_2O_2$, $KMnO_4$, and air oxygen.

40. The chemical conversion coating solution of claim 28 wherein said oxidizing agent is hydrogen peroxide $H_2O_2$.

41. A chemical conversion coating solution that is commercially practical for producing an oxide film cobalt conversion coating on a metal substrate, said solution comprising an aqueous reaction solution containing a 3-valent cobalt complex prepared by reacting the following starting materials:
   (a) a cobalt-II salt wherein said cobalt,II salt is $CoX_2$ where X=Cl, Br, $NO_3$, CN, SCN, $\frac{1}{3}PO_4$, $\frac{1}{2}SO_4$, $C_2H_3O_2$, or $\frac{1}{2}CO_3$;
   (b) one or more inorganic complexing agents selected from the group consisting of a soluble metal carboxylate, a soluble metal nitrite, and ammonia;
   (c) a water soluble amine wherein said water soluble amine is selected from the group consisting of ethylenediamine, triethanolamine (TEA), and ethylenediaminetetraacetic acid (EDTA); and
   (d) an oxidizing agent.

42. The chemical conversion coating solution of claim 41 wherein said cobalt-II salt is cobalt nitrate.

43. The chemical conversion coating solution of claim 41 wherein said soluble metal carboxylate is selected from the group consisting of metal carboxylates having from 1 to 5 carbon atoms.

44. The chemical conversion coating solution of claim 41 wherein said soluble metal carboxylate is selected from the group consisting of soluble metal carboxylates having from 1 to 5 carbon atoms.

45. The chemical conversion coating solution of claim 41 wherein said soluble metal carboxylate is selected from the group consisting of soluble metal salts of acetic acid.

46. The chemical conversion coating solution of claim 41 wherein said soluble metal carboxylate is selected from the group consisting of soluble metal carboxylate salts of Ca, Mg, and Na.

47. The chemical conversion coating solution of claim 41 wherein said soluble metal carboxylate is a soluble metal carboxylate salt of Na.

48. The chemical conversion coating solution of claim 41 wherein said soluble metal carboxylate is sodium acetate.

49. The chemical conversion coating solution of claim 41 wherein said soluble metal nitrite is $MeNO_2$, where Me is one or more selected from the group consisting of Na, K, or Li.

50. The chemical conversion coating solution of claim 41 wherein said soluble metal nitrite is sodium nitrite.

51. The chemical conversion coating solution of claim 41 wherein said water soluble amine is triethanolamine (TEA).

52. The chemical conversion coating solution of claim 41 wherein said oxidizing agent is selected from the group consisting of $H_2O_2$, $KMnO_4$, and air oxygen.

53. The chemical conversion coating solution of claim 41 wherein said oxidizing agent is hydrogen peroxide $H_2O_2$.

54. An improved process that is commercially practical for forming an oxide film cobalt conversion coating exhibiting corrosion resistance and paint adhesion properties on a substrate, wherein said substrate is aluminum or aluminum alloy, said process comprising the steps of:

(a) providing an oxide film forming cobalt conversion solution comprising an aqueous reaction solution prepared by reacting the following starting materials:

(1) cobalt nitrate;
(2) sodium nitrite;
(3) ammonium nitrate;
(4) triethanolamine; and
(5) hydrogen peroxide; and (b) contacting said substrate with said solution for a sufficient amount of time to oxidize the surface of said substrate, whereby said oxide film cobalt conversion coating is formed, thereby imparting corrosion resistance and paint adhesion properties to said substrate.

55. The process of claim 54 comprising the additional step of contacting said coated substrate with an aqueous post conversion treatment solution comprising a solution of vanadium pentoxide and sodium tungstate.

56. An improved process that is commercially practical for forming an oxide film cobalt conversion coating exhibiting corrosion resistance and paint adhesion properties on a substrate, wherein said substrate is aluminum or aluminum alloy, said process comprising the steps of:

(a) providing an oxide film forming cobalt conversion solution comprising an aqueous reaction solution prepared by reacting the following starting materials:

(1) cobalt nitrate;
(2) a metal carboxylate selected from the group consisting of magnesium acetate, calcium acetate, and sodium acetate;
(3) triethanolamine; and
(5) hydrogen peroxide; and (b) contacting said substrate with said solution for a sufficient amount of time to oxidize the surface of said substrate, whereby said oxide film cobalt conversion coating is formed, thereby imparting corrosion resistance and paint adhesion properties to said substrate.

57. The process of claim 56 comprising the additional step of contacting said coated substrate with an aqueous post conversion treatment solution comprising a solution of vanadium pentoxide and sodium tungstate.

* * * * *